United States Patent [19]

Kimoto et al.

[11] Patent Number: 4,520,409
[45] Date of Patent: May 28, 1985

[54] THERMAL AND MAGNETIC RECORDING HEAD

[75] Inventors: Toshifumi Kimoto; Teruhiko Itami; Nobuo Nishimura; Koichi Saitoh, all of Kanagawa, Japan

[73] Assignee: Fuji Xerox Corporation, Limited, Tokyo, Japan

[21] Appl. No.: 396,504

[22] Filed: Jul. 8, 1982

[30] Foreign Application Priority Data

Jul. 10, 1981 [JP] Japan ............................... 56-106966
Jul. 10, 1981 [JP] Japan ............................... 56-106967
Jul. 20, 1981 [JP] Japan ............................... 56-113280

[51] Int. Cl.$^3$ ............................................. G11B 5/02
[52] U.S. Cl. ...................................... 360/59; 346/74.5
[58] Field of Search ................. 360/59, 110, 119, 125; 346/151, 74.5, 115

[56] References Cited

U.S. PATENT DOCUMENTS

| | | | |
|---|---|---|---|
| 3,079,468 | 2/1963 | Morey | 360/119 |
| 3,453,647 | 7/1969 | Berstein et al. | 360/59 |
| 3,686,467 | 8/1972 | Camras | 360/110 |
| 3,686,468 | 8/1972 | Garnier, Jr. | 360/119 |
| 3,824,601 | 7/1974 | Garland et al. | 360/59 |

*Primary Examiner*—Vincent P. Canney
*Attorney, Agent, or Firm*—Sughrue, Mion, Zinn, Macpeak, and Seas

[57] ABSTRACT

A combination thermal and magnetic recording head is advantageously designed such that the heat generating resistor elements forming the thermal device are incorporated with the magnetic head device. Specifically, the thermal head may be incorporated in the air gap of the magnetic device.

10 Claims, 10 Drawing Figures

THERMAL AND MAGNETIC RECORDING HEAD

BACKGROUND OF THE INVENTION

This invention relates to a magnetic recording head for forming a magnetic latent image on a magnetic recording medium. More particularly it relates to a thermal and magnetic writing recording head which, while a magnetization pattern is being applied, selectively heats recording regions or non-recording regions consequently the magnetization pattern at the heated positions differs from that at other positions, whereby the magnetic latent image of a picture to be recorded is formed on a magnetic recording medium.

A magnetic recording device of this type is referred to as being "magnetographic", and employs a magnetic head for writing data on a magnetic recording medium.

Heretofore, the following methods have been employed in the process of forming magnetic latent images by magnetography. In a first method, an AC current modulated with an image signal is applied to a magnetic head which is in close contact with a belt-shaped magnetic recording medium, to form a magnetic latent image on the recording medium. In a second method, a DC current modulated with an image signal is applied to heat-generating elements which are in close contact with a magnetic recording medium having a relatively low magnetic transformation point, to form a magnetic latent image on the recording medium. In the second method, an AC magnetic field is applied to portions of the magnetic recording medium heated to temperatures higher than the magnetic transformation point. However, the employment of the magnetic head is disadvantageous for the following reasons: In the case where one magnetic head is used to write data, it takes a relatively long period of time to form the latent image. Even if a method is employed in which a drum-shaped magnetic recording medium is rotated at high speed to write data, it still takes about thirty seconds to write data on a sheet of "A4" size. Since, in this case, the drum must be turned at high speed and an auxiliary scanning operation is required, the device necessarily becomes intricate in construction and high in manufacturing cost. On the other hand, a so-called "multi-magnetic-head" long enough to cover "A4" or "B4" sizes, in which a number of magnetic heads are juxtaposed to write data with a density of about ten lines/mm for every line might be used. However, in this case, it is necessary to arrange 1,000 to 2,000 magnetic heads in a line, and therefore it is considerably more difficult to manufacture the multimagnetic head.

A magnetic recording device in which particular positions on a magnetic recording medium having a uniform magnetization pattern uses a thermal head for selectively and locally heating the medium to a temperature higher than the transformation point (the Curie point or compensation point). This forms a magnetic latent image on the magnetic recording medium. The device uses a bias magnetic field as a means for imparting the uniform magnetization pattern to the magnetic recording medium and a thermal head as a heating means. In conventional magnetographic devices, these means are provided separately, which has made the device bulky and intricate.

In conventional devices, the bias magnetic field applying means confronts the thermal head on opposite sides of the magnetic recording medium. Accordingly, either the bias magnetic field applying means or the thermal head confronts directly the base layer (generally a plastic film) of the medium. If the thickness of the base layer is taken into account, either the bias magnetic field or heat from the thermal head as the case may be will not be directly applied to the recording medium. As a result of which the printed image will be low in density, i.e., less than 1.0.

In order to increase the recording speed in the first method described above, it is essential to drive a number of recording heads juxtaposed over the recording medium. The magnetic head array cannot be manufactured without a considerably intricate and delicate machining technique. Such a magnetic head array is considerably expensive to manufacture. Thus, the first method is not practical.

One example of a process of forming a magnetic latent image according to the second method will be described with reference to FIG. 1. A magnetic recording medium 1 having a relatively low magnetic transformation point, is provided in the form of a belt supported by a base layer 2. A heat-generating element array 3 has a heat-generating section 4 which is run in close contact with the recording medium. Current signals are applied to the heat-generating element array 3 according to image data, so as to heat the recording medium 1 to temperatures higher than the magnetic transformation point. In this operation, AC current flows in a winding 6, so that an AC magnetic field is formed in the gap of a magnetic head core 5. Therefore, while the magnetic recording medium 1 is being cooled down, the heated portions of the recording medium are subjected to thermal residual magnetization, whereby the AC magnetic field is left in the form of a magnetization pattern in the recording medium. The magnetic recording medium, which is essential for practicing the method, may be formed with $CrO_2$ for instance.

The Curie point of $CrO_2$ is about 130° C., which can be readily reached by the heat-generating element array. In general, a plastic material is employed as a base layer for the $CrO_2$ recording medium. The plastic material is thermally deformed at temperatures around 130° C. Therefore, if the recording medium is used repeatedly, the thermal deformation appears as noise in the process of development with magnetic toner. In addition, $CrO_2$ is, in general, dispersed in a binder, to prepre a coating type recording medium, and therefor its magnetization density is not high. Accordingly, the developing capability thereof is not sufficient even when saturated recording is employed.

SUMMARY OF THE INVENTION

An object of this invention is to provide a magnetic recording head for magnetography in which the above-described difficulties accompanying a conventional magnetic recording head have been eliminated. Another object of the invention is to provide a magnetic recording head which can form a magnetic latent image at high speed, and which can be manufactured without a delicate machining technique.

Another object of the invention is to provide a magnetic recording head in which the thermal deformation of a base layer which supports a magnetic recording medium is prevented, such that excellent magnetic latent images are formed at all times.

A further object of the invention is to provide a magnetic recording head which can use any magnetic medium to form magnetic latent images. According to the invention, a means for applying a magnetization pattern to a magnetic recording medium according to a bias magnetic field and a thermal head, as a heating means, are formed into one unit, whereby the magnetic recording device is made compact. More specifically, in a thermal and magnetic writing/recording head according to the invention, an AC signal is applied to two bias magnetic field applying sections, each of which is obtained by providing a winding on a soft-ferrite plate, to form a bias magnetic field. A heat applying section is disposed between the two bias magnetic field applying sections heat-generating resistors are caused to generate heat at temperatures close to the Curie point of the magnetic recording medium in response to signals supplied according to image data. In the case of the recording head according to the invention, the bias magnetic field and the heat can be applied to the same side of the recording medium.

In the magnetic recording head of the invention, a long magnetic recording head core is provided substantially perpendicularly to the direction of movement of the magnetic recording medium. Divided heat-generating elements are provided on a high permeability element having a relatively low magnetic transformation point. A non-magnetic element for insulating the high permeability element from the recording medium is provided in the air gap of the magnetic recording head where the latter is brought into contact with the recording medium.

According to the invention, the high permeability element is disposed as a spacer in the air gap provided in the magnetic recording head core, and the heat-generating means, which are divided in correspondence to the width of the picture elements, are provided beneath the high permeability element.

Figure 6:
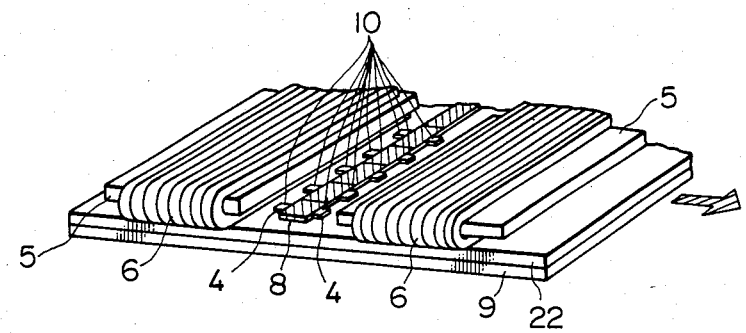
FIG. 6 is a perspective view showing the construction of another thermal and magnetic recording head according to this invention.
Figure 7:
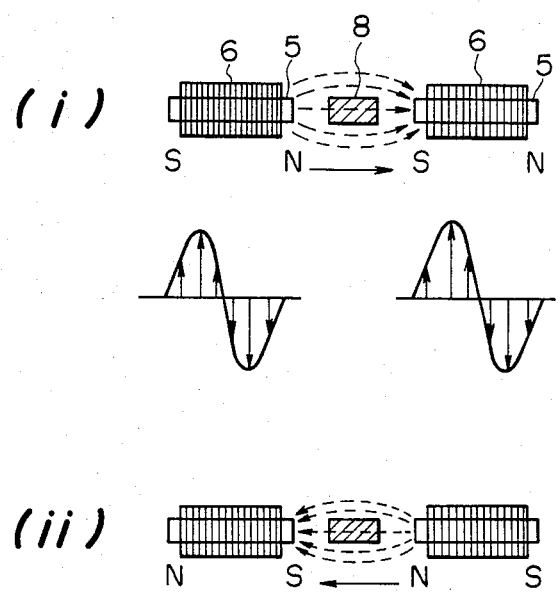
Figure 8:
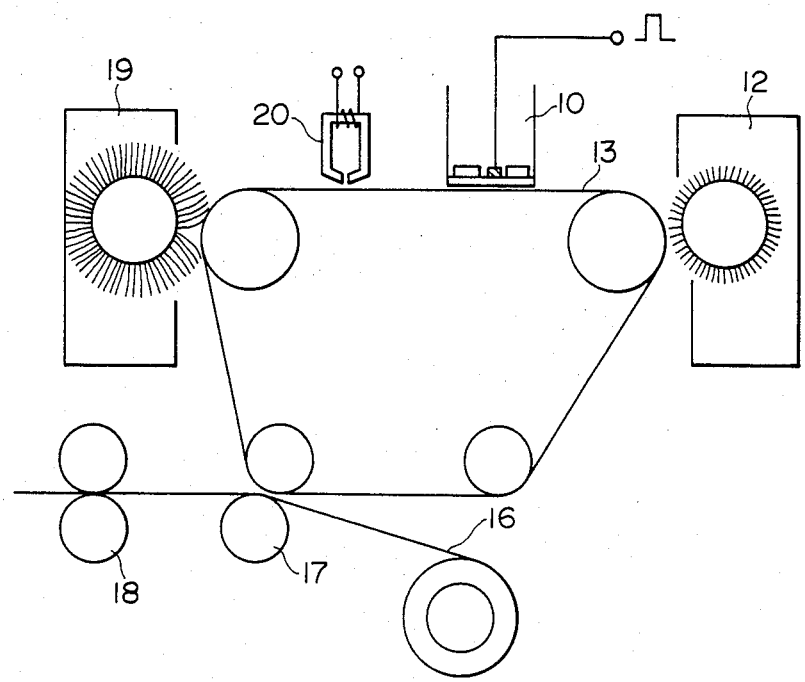
Figure 9:
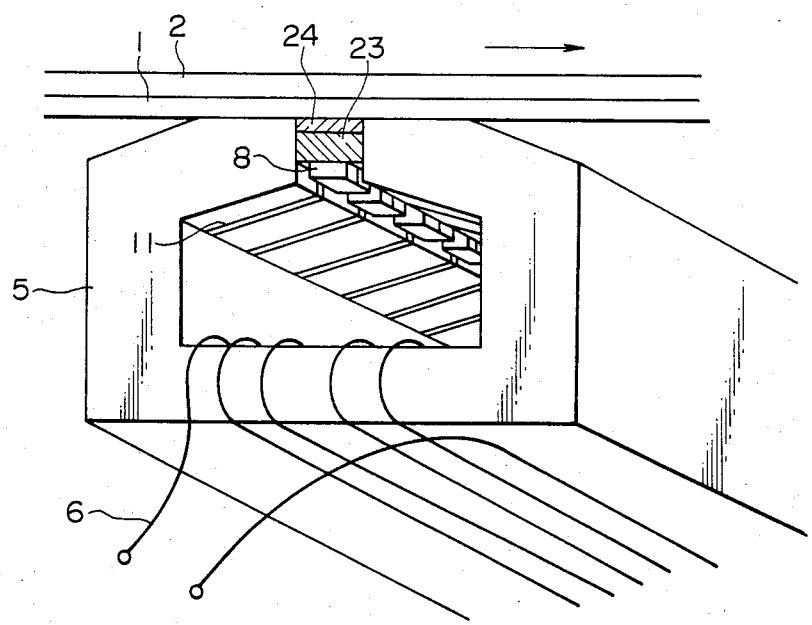

Parts (i) and (ii) of FIG. 7 are explanatory diagrams showing a bias magnetic field application pattern provided by the thermal and magnetic recording head of the invention;

FIG. 8 is an explanatory diagram showing the arrangement of a magnetic printing device using the thermal and magnetic recording head of FIG. 6; and FIG. 9 is an explanatory diagram showing another arrangement of a magnetic recording head according to this invention.

DETAILED DESCRIPTION OF THE PREFERRED EMBODIMENTS

Figure 1:
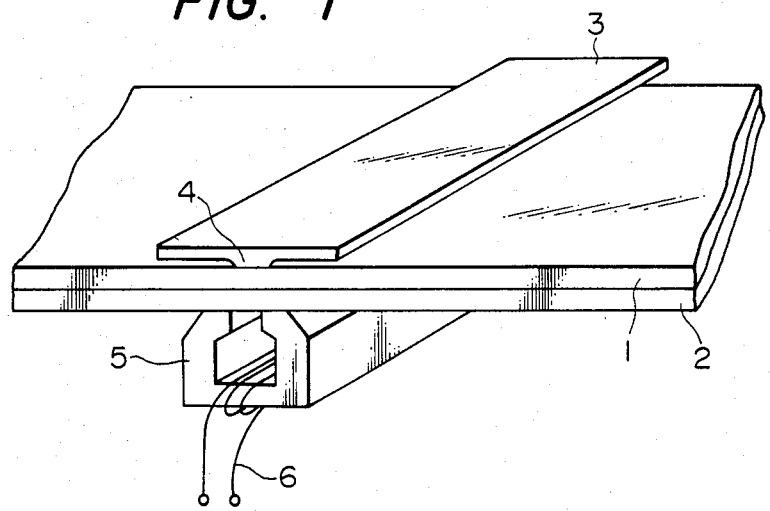
FIG. 1 is an explanatory diagram showing the principle of a conventional magnetic latent image forming process.
Figure 2:
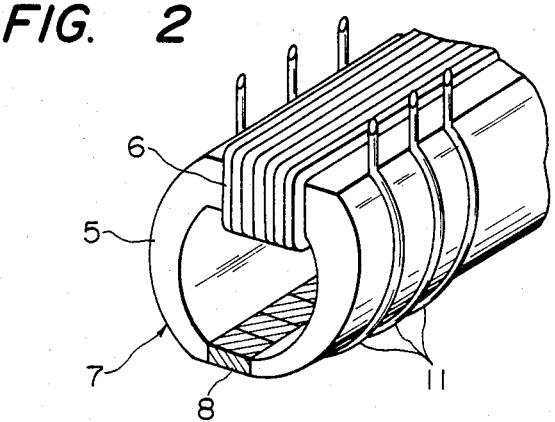
FIG. 2 is a perspective view outlining one example of a thermal and magnetic writing/recording head according to this invention.

The embodiments of this invention will be described with reference to the accompanying drawings. In FIG. 2, a bias magnetic field applying section, namely, a magnetic head 7, is longer than 257 mm (the length of the short side of size "B4" paper). The elongated magnetic head 7 is similar in configuration to an ordinary magnetic head. The core material is 78% permalloy. A winding 6 is obtained by winding an ordinary enameled copper wire 500 turns. An AC source is connected to the winding 6. Therefore, as a magnetic recording medium passes below the head, it is uniformly magnetized in an AC mode.

The air gap of the magnetic head is filled with a series of heat generating resistors in such a manner that the latter are made integral with the magnetic head. Accordingly, a magnetic field and heat can be simultaneously applied to the recording medium from the same side.

Figure 3:
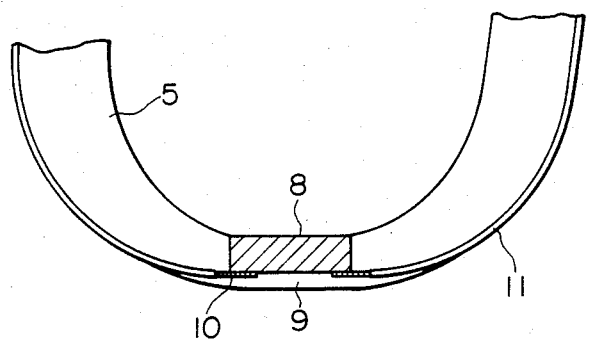
FIG. 3 is an enlarged view of a portion of the head of FIG. 2 which is brought into contact with a magnetic recording medium.

FIG. 3 is an enlarged view of the heat applying section shown in FIG. 2. It is substantially similar in arrangement to an ordinary thermal head in that it uses generally similar components, i.e., heat generating resistors in cooperation with a heat generating section. It is different in the configuration of those components from conventional devices as follows. As shown in FIG. 3, the gap (50 $\mu$m) of the magnetic head is filled with the heat generating resistors ($RuO_2$) 8, 30 $\mu$m in thickness, according to a lift-off method. Further in FIG. 3, reference numeral 9 designates a layer of overcoat glass 10 $\mu$m in thickness; and 10, Ag-Pd electrodes. These are printed on the bias magnetic field applying section before the magnetic head is finished. Lead wires 11 are connected to the electrodes. According to the image data, signals are applied to the lead wires, so that currents flow in the heat generating resistors 8. As a result, the heat generating resistors generate heat at a temperature near the Curie temperature of the magnetic recording medium, so that a thermal pattern is formed according to the applied signals.

In order to provide the elongated magnetic head, the electrodes and the lead wires are printed before the winding is formed on the magnetic head. The density of the electrodes and lead wires is considerably high, eight to ten per millimeter (8 to 10 lines/mm).

Figure 4:
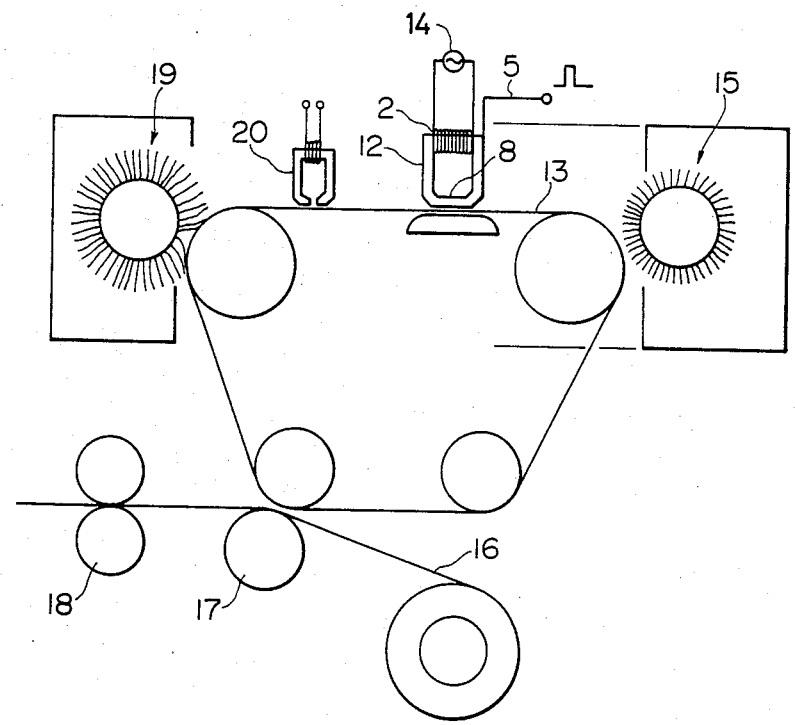
FIG. 4 is a an explanatory diagram showing a magnetic printing device using the head shown in FIG. 2.

Images have been printed using a magnetic printing device which employs the above-described magnetic head, as shown in FIG. 4. In FIG. 4, reference numeral 12 designates the thermal and magnetic wrinting recording head according to the invention in which a bias magnetic field applying means is integral with a thermal head. A portion of the head, which confronts the recording medium, is in close contact therewith. The magnetic recording medium 13 is a belt contained by applying $CrO_2$, the Curie temperature of which is about 130° C., to a base film. A bias magnetic field applied by an AC source 14 provides a force of 50 Oe, which is smaller than the coercive force of 500 to 600 Oe of $CrO_2$. The bias magnetic field is applied to the magnetic recording 13 at all times. Signals corresponding to the image data are applied to the heat generating resistors, so that a thermal pattern is formed on the recording medium 13. More specifically, the coercive force of the $CrO_2$ is decreased only at those positions on the medium 13 to which heat has been applied, so that a magnetization pattern is formed by a thermal residual magnetic effect. Before the magnetic recording medium is cooled, the magnetization pattern is formed according to the image data. The magnetic latent image is developed by a developing unit 15, and the developed image is transferred onto an ordinary sheet 16 by a transferring unit 17.

The image transferred onto the ordinary sheet 16 is fixed by a fixing unit 18. The magnetic toner left on the recording medium 13 is removed by a cleaner 19, and the recording medium is demagnetized by a demagnetizer 20.

In FIG. 4, the recording medium 13 is in the form of a belt; however, if $CrO_2$ is coated over a drum, then a drum-shaped recording medium may be employed. The cleaner 19 may be either a fur brush cleaner or a blade cleaner.

Images were printed on ordinary sheets with the device described above, with fine results. The image density was more than 1.0, the background was less than 0.02 and the resolution was 8 to 10 dots/mm. Even after 10,000 sheets were printed, fine results were still obtained, and the wear-resistance of the layer of overcoat glass 9 and the heat-resistance of the core 5 of the magnetic head in FIG. 3 were maintained unchanged. Thus, it was confirmed that the device according to the invention operated satisfactorily. The magnetic head and the thermal head are formed into one unit according to the invention, and accordingly in assembling the printing device the troublesome step of separately or individually installing the magnetic and thermal heads is eliminated.

Figure 5:
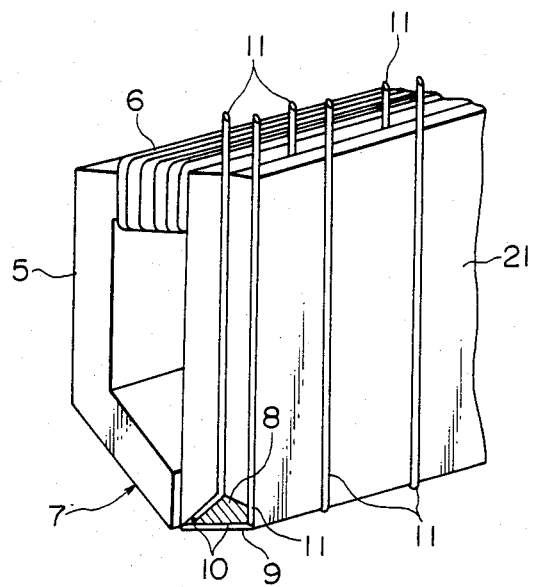
FIG. 5 is a perspective view of one modification of the head according to the invention.

FIG. 5 shows another embodiment of the invention. In this embodiment, the heat applying section is set as close as possible to the air gap of the magnetic head, so that the elongated heat applying section is provided integrally with the magnetic head. The head assembly shown in FIG. 5 is obtained by providing the heat applying section shown in FIG. 3 on one side of the bias magnetic field applying section of the magnetic head. The heat applying section may be prepared in advance, or it may be formed on the bias magnetic field applying section of the magnetic head. In FIGS. 2, 3, 4 and 5, like components are identified by like reference numerals. In FIG. 5, reference numeral 21 designates a nonmagnetic substrate.

Another embodiment of this invention will be described with reference to FIGS. 6-8 in detail.

A bias magnetic field applying section, as shown in FIG. 6, is made up of a soft-ferrite plate 5 of 78% Ni-Fe and a winding 6 which is obtained by winding a commercially available enameled copper wire (40 μm in outside diameter) 500 turns on the plate. The section thus formed is longer than the short side (257 mm) of size "B4" paper, and is elongated in the width direction. An AC source is connected to the magnetic field applying section. More specifically, the AC sources of the magnetic field applying sections are connected so that an AC magnetization pattern is formed as shown in parts (i) and (ii) of FIG. 7.

The two magnetic field applying sections thus formed are provided on a substrate 22 of aluminia (100 μm in thickness), and a heat applying section is disposed between the magnetic field applying sections. The heat applying section is molded to 5 mm in thickness with epoxy resin, to form the desired head. As the head is formed as described above, the magnetic field and heat can be applied simultaneously to the recording medium from the same side.

The heat applying section is again similar in construction to an ordinary thermal head in that it uses the same compounds, i.e., heat generating resistors in cooperation with a heat generating section, but different in configuration. The heat generating resistors 8 are made of $RuO_2$, and are arranged at a density of 8 to 10/mm, being 100 μm in width and 30 μm in thickness. Electrodes 10 of Ag-Pd are printed at both ends of each resistor 8, and lead wires (not shown) are connected to the electrodes 10 so as to be used as image signal applying terminals. The head has a wear-resistant layer 9 15 μm in thickness, which is formed by coating the substrate with glass. Therefore, the head can sufficiently resist wear due to the magnetic recording medium.

Images have been printed using a magnetic printing device as shown in FIG. 8, which employs the above-described head in which the magnetic field applying sections are integral with the heat applying section.

The magnetic recording belt 13 is obtained by applying $CrO_2$ to a base film. The coercive force provided by the bias magnetic field is 50 Oe, which is smaller than the coercive force to 500 to 600 Oe of $CrO_2$. The bias magnetic field is applied to the magnetic recording medium 13 at all times, and signals according to the image data are applied to the heat generating resistors 8, so that a thermal pattern of temperature close to the Curie temperature is formed. More specifically, the coercive force of $CrO_2$ is decreased only at those positions on the medium 13 to which heat has been applied, so that a magnetization pattern is formed by a thermal residual magnetic effect before the medium is cooled. The magnetization pattern according to the image data is formed, and the magnetic latent image is developed by a developing unit. In this operation, magnetic toner sticks to the latent image to develop the latter. The image thus developed is transferred onto an ordinary sheet 16 by a transferring unit 17.

The image thus transferred is fixed to the sheet 16 by a fixing unit 18. The magnetic toner left on the recording medium is removed by a cleaner 19, and the recording medium is demagnetized by a demagnetizer 20.

In FIG. 8, the recording medium 13 is in the form of a belt; but may be in drum form.

Images were printed on ordinary sheets with the device shown in FIG. 8, with excellent results. The image density ID was more than 1.0, the background ID was less than 0.02 and the resolution was 8 to 10 lines/mm. Even after 10,000 sheets were printed, excellent results were still obtained, and the wear-resistance of the wear-resisting layer 9 and the heat-resistance of the head were maintained unchanged.

As is apparent from the above description, this embodiment has the following merits:

The bias magnetic field applying means and the heat applying means are formed into one compact unit, which makes it possible to miniaturize the device and to simplify the construction thereof.

Since the strength of the bias magnetic field is smaller than the coercive force of the $CrO_2$ forming the magnetic recording medium, the bias magnetic field can be formed by a relatively small current.

Also, the bias magnetic field and the heat are simultaneously applied from the side of the recording layer of the magnetic recording medium, and accordingly the bias magnetic field and the heat are not attenuated by the thickness of the base layer. Therefore, the image is much higher in density than that according to the conventional method.

A further embodiment according to this invention will be described with reference to FIG. 9. AC current is allowed to flow in a winding 6 at all times. The frequency of the AC current is set to a suitable value according to the relative speed of the recording medium and the magnetic head and the grain size of the toner. DC current is supplied to a heat generating section 8 through conductors 11; however, when no DC current is supplied thereto, the magnetic path is as follows: Magnetic lines of force passing through magnetic head core 5 penetrate a high permeability element 23, thus providing a complete closed path. The collector current of a transistor (not shown), which is connected to the conductor 11 and is selectively turned on and off. The heat generating section drives the temperature higher than the magnetic transformation point of the high permeability element 23, thus demagnetizing the latter. The magnetic flux which is induced by the current flowing in the winding 6 leaks into the air gap near the high permeability element 23, which is selectively demagnetized according to the image data. Therefore, when a magnetic field whose strength is larger than the coercive force of the recording medium 1 is applied, a magnetization pattern is left in the form of a magnetic latent image on the recording medium.

In the invention, a non-magnetic element 24 is disposed in the air gap of the magnetic head core which is brought into contact with the recording medium 1, so that the recording medium is insulated from heat generated by the heat-generating section. In other words, the non-magnetic element 24 serves to prevent the thermal deformation of the base layer 2 of the magnetic recording medium.

The high permeability element may be made of Ni-Zn ferrite or $Ni_{0.79}$ Fe alloy. The Curie point of the former is 150° C., and that of the latter is about 250° C.

The non-magnetic element 24 may be brought directly into contact with the recording medium as shown in FIG. 9, or it may be brought into contact with the recording medium through the base layer.

The magnetic recording head of the invention may be modified such that a number of high permeability elements are arranged in the direction of the head, and DC currents are applied to the high permeability elements selectively according to the image data, so that heating is effected at temperatures higher than the magnetic transformation point by the heat generated by the high permeability elements. It goes without saying that the provision of the heat-generating element is unnecessary in this modification. It is desirable in this case that the high permeability elements be made of single crystal ferrite having an electrical resistance of about 0.2 Ω-cm, which is employable for heat-generating elements. Furthermore, it is desirable that the magnetic head core be made of hot static water pressure pressed ferrite of high electrical resistance.

As conducive to a full understanding of the above embodiment, an example of the magnetic recording heat according to the invention will be described.

EXAMPLE

The high permeability element 23 was made of Ni-Zn ferrite, and a non-magnetic element 24 having a thickness of 10μ was formed on the high permeability element 23 by sputtering. Instead of these materials, other materials may be employed as long as they are high in heat-resistance and suitable working methods are employed. The width was 30 μm, and the length, i.e., the track width of the magnetic head, was 10 cm. The magnetic transformation point, or the Curie point, of the high permeability element 23 was 150° C. Magnetic recording medium of Co-Ni-P alloy was formed on one side of the base layer 2. The recording medium 1 was 2 μm in thickness. The magnetic recording medium 1 and the magnetic head core 5 were arranged as shown in FIG. 9. The recording medium 1 was run with the magnetic head core 5 in contact with the exposed surface of the recording medium 1. The relative speed of the recording medium and the heat generating section 8/magnetic head core 5 was 3.8 cm/sec. The frequency of the sinusoidal current applied to the winding 6 was 200 Hz. That is, the wavelength of the magnetization which remained as a two-dimensional pattern on the magnetic recording layer was 190 μm. A magnetic latent image formed under this condition was visualized with magnetic toner. The optical density I.D. of the image thus visualized was more than 1.1. Thus, it was ensured that the magnetic recording head had a sufficiently high image-forming capability.

The magnetic recording head according to the invention can form magnetic latent images at a speed higher than that of the conventional device. In addition, with the magnetic recording head of the invention, a magnetic recording head for magnetography can be provided which requires no special machining technique. Furthermore, according to the invention, the means for heating the magnetic recording medium is not particularly limited; i.e., any desired heating means can be used according to the material of the base layer of the recording medium, and therefore no thermal deformation occurs with the base layer. Moreover, with the magnetic recording head of the invention, magnetic latent images can be formed on any magnetic recording media. Thus, the invention has an excellent effect in that the magnetic recording head can be employed for a magnetography device of high developing capability. The magnetization pattern is formed only in portions of the magnetic recording medium which are selectively heated by the heat-generating elements, and when the pattern is developed, a so-called "positive pattern" is obtained. Thus, the invention is advantageous in that, in printing an original such as an ordinary document, the larger part of which is white, the amount of energy required for forming the latent image is very small.

What is claimed is:

1. A magnetic recording head, comprising: a high permeability element having a relatively low magnetic transformation point; a non-magnetic element in the form of a layer formed on said high permeability element, said non-magnetic element being in close contact with a magnetic recording medium; and heat generating means divided for selectively applying a voltage to said high permeability element to thereby heat the latter, said high permeability element, non-magnetic element and heat generating means being provided in an air gap formed in a magnetic head core; said heat generating means comprising an array of selectively energizable resistors collectively forming a thermal head.

2. A recording head as claimed in claim 1, said heat-generating means selectively generating a temperature greater than a Curie point of said high permeability element, to effect selective demagnetization thereof.

3. A recording head as claimed in claim 1, said non magnetic element comprising head insulating means for preventing thermal deformation of a magnetic recording medium.

4. In a magnetic recording head for forming a magnetic latent image on a magnetic recording medium, the improvement comprising heat-generating resistors formed in or proximate an air gap of a bias magnetic field applying head, said heat-generating resistors being caused to generate heat according to image signals applied thereto to form a thermal recording head in combination with said magnetic head; said heat generating means comprising an array of selectively energizable resistors collectively forming a thermal head.

5. A recording head as claimed in claim 4, said heat-generating resistors filling said air gap.

6. A recording head as claimed in claim 4, said heat-generating resistors being coated with a glass layer on a side thereof for contacting a recording medium.

7. A recording head as claimed in claims 4 or 5, said heat generating resistors being selectively operated to generate heat at a temperature approximating a Curie temperature of a magnetic recording medium.

8. A recording head as claimed in claim 4, said heat-generating resistors being formed on a side of said magnetic field applying head.

9. A thermal and magnetic writing recording head, comprising;
   two bias magnetic field generating sections, each comprising a magnetizable plate and a winding provided on said magnetizable plate, said two bias magnetic field generating sections being spaced from each other; and
   a plurality of heat generating resistors provided between said two bias magnetic field generating sections; said two magnetic field generating sections and said heat generating resistors being substantially coplanar.

10. A recording head as claimed in claim 9, said bias magnetic field generating sections and said heat generating resistors being covered with a wear-resisting layer.

* * * * *